United States Patent Office 2,743,544
Patented May 1, 1956

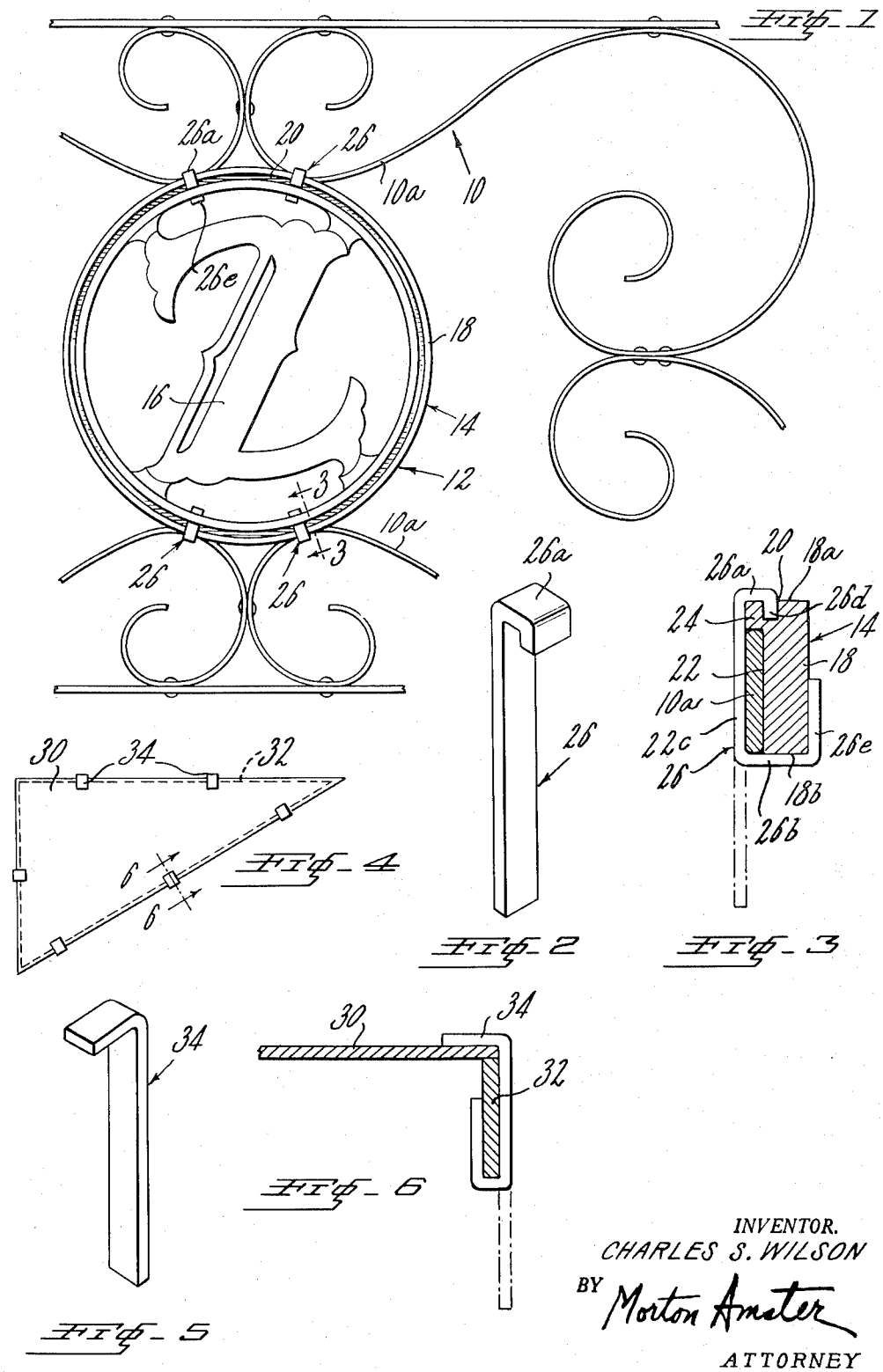

2,743,544

ASSEMBLY BRACKETS

Charles S. Wilson, Long Beach, N. Y.

Application December 17, 1953, Serial No. 398,793

3 Claims. (Cl. 41—34)

The present invention relates to clamping means for fixing elements together and in particular to low cost assembly brackets facilitating rapid securement of removable inserts to supports and the like.

Hand-wrought ornamental grilleworks are finding widespread application about the home. These grilleworks, used both for ornamentation and protection of doors and the like, are frequently personalized by attaching identifying-indicia, such as an initial or monogram insert designed in accordance with the requirements of the home owner.

A typical construction includes a grillework formed to provide a seat for accommodating a cast-metal insert which is secured in a particular rotational orientation with respect to the grillework by nuts and bolts. Holes are formed in the grillework through which the bolts are extended, while elongated adjusting slots are provided in the insert which facilitates positioning of the insert relative to the grillework. The prescribed arrangement represents a fairly expensive and time consuming mode of attachment, involving the initial boring and slotting of the grillework and insert. Further, structural weaknesses are introduced into the inserts through the slotting operation, resulting in a much higher breakage factor, especially since the inserts are cast and somewhat fragile.

Accordingly, it is an object of the present invention to provide a clamping mechanism obviating one or more of the above said difficulties. It is within the contemplation of the invention to provide a simplified means for fixing inserts, such as a cast-metal member designed to form an initial or monogram, within a grillework without requiring modification of either the insert or the grillework.

It is a still further object to the present invention to provide a clip member for detachably joining an ornamental insert to a support, which may be applied by simple manual manipulation, and does not attract from the eye-appeal of the final assembly.

In accordance with one aspect of the invention, as applied to the ornamentation of a grillework-type support, a decorative insert is arranged within a receiving area formed within a support. The sections of the support abutting the insert constain the same against movement generally in the plane of the support, while plural clamp members, each securable about the support and the insert, confine the insert against displacement in a direction substantially normal to the plane of the support. Each of the clamp members includes sections engaging the decorative insert and further sections embracing both the support and the insert. It will be appreciated that the described construction permits the required mounting without the necessity of modifying the structure of the insert or of the support, with the manifest disadvantages of structural weakening and detracting from the appearance of the assembly.

The above and still further features of the invention will be best appreciated upon reference to the following detailed description of a presently preferred embodiment, when taken in conjunction with the accompanying drawings, wherein:

Fig. 1 is a plan view, with parts broken away and in section, showing a typical assembly employing clamps embodying features of the present invention;

Fig. 2 is a perspective view of an unbent clamp initially formed in accordance with the invention;

Fig. 3 is a sectional view taken substantially along the line 3—3 of Fig. 2 and looking in the directions of the arrows, the unbent position of the clamp being illustrated by the broken lines;

Fig. 4 is a plan view of a further assembly employing clamps formed in accordance with the present invention;

Fig. 5 is a perspective view of the modified clamp employed in the assembly of Fig. 4; and, Fig. 6 is a sectional view taken substantially along the lines 6—6 of Fig. 4 looking in the direction of the arrows, the unbent of the position being illustrated by the broken lines.

Referring now specifically to Figs. 1 to 3 inclusive, there is shown a support in the form of a decorative grillework 10 which includes plural curved runs or sections 10a defining a substantially circular seating area 12. In accordance with one aspect of the invention, the grille may be personalized by provision of a cast-metal insert 14 in the substantially circular seating area 12 defined by the cooperating sections 10a of the grillework 10. The insert 14 includes a cast initial member 16 set into and fixed within an annular frame 18. The annular frame 18, the cross section of which is seen best in Fig. 3, includes parallel upper and lower surfaces 18a, 18b, the upper surface 18a being formed with an annular seating groove or channelway 20. The outer periphery of the rim or frame 18 is undercut, as indicated on 22, to form an outstanding shoulder 24. The degree of undercutting is selected so that the adjacent supporting sections 10a of the support 10 may be conformably received within the outline of the frame 18 beneath the shoulder. It will be appreciated, upon inspection of Fig. 3, that at locations of peripheral contact of the supporting sections 10a and the frame 18, the section of the assembly presented for clamping is substantially rectangular.

In accordance with certain aspects of the present invention, wrap around type of clasp or clamping members 26 are seated in the annular slot or groove 20 and conformed about the nested segments of the frame 18 and of the supports 10a. Specifically, the clamping members or bands 26 are each of a J-shape and are fabricated of bendable material of sufficient strength to rigidly connect the insert 14 within the frame 10. As seen in Fig. 3 each clamping member 26 includes spaced and parallel intermediate sections 26a, 26b respectively in contact with the upper and lower surfaces 18a, 18b of the frame 18, a connecting section 22c extending between the parallel sections 26a, 26b and abutting the continuous surface presented by the outermost faces of the shoulder 24 and the support section 10a, an inturned terminal section 26d conformed to and seated within annular slot 20 at a predetermined circumferential location, and a further inturned terminal section 26e spaced inwardly of the terminal section 26d and coextensive with and abutting against the lowermost portion of the inner peripheral surfaces of the annular frame 18. Although the illustrative construction of Figs. 1 to 4 shows four clamps at selected circumferential locations about the ornamental insert 14, any number of clamps or bands may be employed.

In the actual assembly it will be appreciated that there is no need for cutting away of sections of either the support 10 or of the insert 14, as by forming holes to receive bolts, or the like. The connection of the insert 14 in the support or frame 10 merely requires placing the same in the seated position of Fig. 1, and wrapping around the respective clamping members 26 at the required spaced locations in accordance with well understood techniques, employing pliers or similar bending tools.

Reference will now be made to Figs. 4 to 6 inclusive wherein there is shown a modified clamping member 34 embodying further features of the invention and providing a simplified means for connecting an insert 30 of plastic material or the like in place on a metallic support 32, for example, of wrought metal. Specifically the insert 30 is arranged in overlying relation to the complementary triangular frame and is maintained in place by plural clamping members 34. Each of the clamping members 34 is of L-shaped configuration, as seen in Fig. 5, prior to being brought into operative relation for holding the sheet 32 on the frame 30. The mode of applying the respective bendable clamp members 34, will be appreciated from the description relating to the embodiment of Figs. 1 to 4.

While in accordance with the provisions of the statutes, I have illustrated and described the best embodiments of my invention now known to me, it will be apparent to those skilled in the art that changes can be made in the embodiments disclosed without departing from the spirit of my invention as set forth in the appended claims and that in some cases certain features of my invention may be used to advantage without a corresponding use of other features.

What I claim is:

1. In combination, a framework, a decorative insert, said insert including a rim portion, the outer periphery of said rim being undercut to form a shoulder extending outwardly from one of said opposed faces, said one of said faces being formed with a depression, said framework including framing sections arranged to form a seat receiving said decorative insert, said framing sections lying beneath said shoulder and within the undercut, said framing sections confining said decorative insert against movement in the plane of said framework, and clamp means including a first section engaged within said depression and a second section engaging said framing section.

2. In combination, a grille framework, a substantially circular decorative insert, said insert including a rim having opposed faces, the outer periphery of said rim being undercut to form a shoulder extending outwardly from one of said opposed faces and terminating in an outer surface, said one of said faces being formed with a continuous annular groove, said grille framework including framing sections arranged to form a seat receiving said decorative insert, said framing sections lying beneath said shoulder and within the undercut, said framing sections confining said decorative insert against movement relative to the plane of said framework and each having their outer surface substantially flush with the outer surface of said shoulder, and plural clamp means each including a first section engaged within said groove, a second section engaging the outer surface of said framing section, and a third section embracing the other face of said rim whereby said decorative insert is confined against movement in a direction normal to the plane of said framework.

3. In combination, a grille framework, a substantially circular decorative insert, said insert including a rim having opposed faces, the outer periphery of said rim being undercut to form a shoulder extending outwardly from one of said opposed faces and terminating in an outer surface, said one of said faces being formed with a continuous annular groove, said grille framework including framing sections arranged to form a seat receiving said decorative insert, said framing sections lying beneath said shoulder and within the undercut and peripherally engaging said rim, said framing sections confining said decorative insert against movement relative to the plane of said framework and each having their outer surface substantially flush with the outer surface of said shoulder, and plural clamp means each including a first section engaged within said groove, a second section engaging the outer surface of said framing section, a third section embracing the other face of said rim, and a fourth section engaging the inner periphery of said rim whereby said decorative insert is confined against movement in a direction normal to the plane of said framework.

References Cited in the file of this patent
UNITED STATES PATENTS

| | | |
|---|---|---|
| 2,003,856 | Gimbel | June 4, 1935 |
| 2,636,298 | Macklanburg | Apr. 28, 1953 |